(12) United States Patent
Luce

(10) Patent No.: US 10,000,279 B2
(45) Date of Patent: Jun. 19, 2018

(54) RETRACTABLE LANDING GEAR

(71) Applicant: Goodrich Corporation, Charlotte, NC (US)

(72) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 254 days.

(21) Appl. No.: 15/001,841

(22) Filed: Jan. 20, 2016

(65) Prior Publication Data

US 2016/0280361 A1 Sep. 29, 2016

Related U.S. Application Data

(60) Provisional application No. 62/137,572, filed on Mar. 24, 2015.

(51) Int. Cl.
*B64C 25/10* (2006.01)

(52) U.S. Cl.
CPC .................... *B64C 25/10* (2013.01)

(58) Field of Classification Search
CPC ......... B64C 25/02; B64C 25/10; B64C 25/12; B64C 25/14; B64C 25/18; B64C 25/20; B64C 25/24; B64C 25/26; B64C 25/58; B64C 2025/125
See application file for complete search history.

(56) References Cited

U.S. PATENT DOCUMENTS

| 2,661,171 | A | 12/1953 | John H Allen |
| 3,870,254 | A | 3/1975 | watts |
| 7,967,245 | B2 | 6/2011 | Seror-Goguet |
| 2009/0284025 | A1 | 11/2009 | Salcombe |

*Primary Examiner* — Richard G Davis
(74) *Attorney, Agent, or Firm* — Snell & Wilmer L.L.P.

(57) ABSTRACT

The present disclosure describes systems and methods for retractable landing gear. A landing gear arrangement may comprise: a trailing arm; a shock strut; a link rotatably coupled to a first end of the shock strut and rotatably coupled to the trailing arm, the link including a pivot; a rotatable latch rotatably coupled to the link; and an actuator coupled between the rotatable latch and the trailing arm, the rotatable latch configured to rotate about the pivot, the pivot located between a first end and a second end of the rotatable latch, the rotatable latch configured to rotate in a first direction in response to the actuator extending and configured to rotate in a second direction in response to the actuator compressing.

17 Claims, 3 Drawing Sheets

RETRACTABLE LANDING GEAR

CROSS REFERENCE TO RELATED APPLICATIONS

This application is a nonprovisional of and claims priority to U.S. Provisional Patent Application Ser. No. 62/137,572, filed on Mar. 24, 2015 and entitled "RETRACTABLE LANDING GEAR" which is hereby incorporated by reference in its entirety for all purposes.

FIELD

The present disclosure relates generally to landing gear for aircraft and more specifically to a retractable landing gear.

BACKGROUND

The landing gear on various helicopters hangs into the wind stream, causing drag that tends to reduce top speed and range.

SUMMARY

Systems and methods for retractable landing gear are provided herein, in accordance with various embodiments. A landing gear arrangement, may comprise: a trailing arm; a shock strut; a link rotatably coupled to a first end of the shock strut and rotatably coupled to the trailing arm, the link including a pivot; a rotatable latch rotatably coupled to the link; and an actuator coupled between the rotatable latch and the trailing arm, the rotatable latch configured to rotate about the pivot, the pivot located between a first end and a second end of the rotatable latch, the rotatable latch configured to rotate in a first rotational direction in response to the actuator extending and configured to rotate in a second rotational direction in response to the actuator compressing.

In various embodiments, the link may be configured to rotate in the first rotational direction in response to the actuator extending and may be configured to rotate in the second rotational direction in response to the actuator compressing. The landing gear arrangement may be configured to move to an extended position in response to the actuator compressing and may be configured to move to a stowed position in response to the actuator extending. The trailing arm may include a receiving member, the receiving member configured to receive a portion of the link in response to the landing gear arrangement moving to the extended position. The trailing arm may include a first roller pin and a second roller pin, the rotatable latch configured to be fastened to the first roller pin in response to the actuator compressing and configured to be fastened to the second roller pin in response to the actuator extending. The trailing arm may be configured to be rotatably coupled to a fuselage at a first end of the trailing arm and may be configured to be coupled to an axle at a second end of the trailing arm. A second end of the shock strut may be rotably coupled to a fuselage. The link may be connected to the shock strut and the trailing arm via a pin connection at each end. The actuator may be coupled to the trailing arm proximate the first end and the link may be coupled to the trailing arm proximate the second end.

A landing gear arrangement may comprise: a rotatable latch rotatably coupled to a pivot, the pivot located on a link between a trailing arm and a first end of a shock strut; an actuator operatively coupled to the rotatable latch, the actuator configured to actuate in a first linear direction to apply a first moment to the rotatable latch to rotate the rotatable latch in a first rotational direction, wherein the rotatable latch disengages a first roller pin in response to the rotation.

In various embodiments, the actuator may be configured to actuate in a second linear direction to apply a second moment to the rotatable latch to rotate the rotatable latch in a second rotational direction, wherein the rotatable latch disengages a second roller pin in response to the rotation. The trailing arm may be configured to rotate about a first end of the trailing arm in the first rotational direction in response to the actuator actuating in the second linear direction, and may be configured to rotate about the first end of the trailing arm in the second rotational direction in response to the actuator actuating in the first linear direction. A first end of the link may be configured to be received by a receiving member in response to the actuator actuating in the second linear direction. The trailing arm may be rotatably coupled to a fuselage at the first end of the trailing arm and coupled to an axle at a second end of the trailing arm. The shock strut may be rotatably coupled to the link at the first end of the shock strut and may be rotatably coupled to the fuselage at a second end of the shock strut. The rotatable latch may be configured to engage a stopper in response to the rotatable latch rotating in at least one of the first rotational direction and the second rotational direction. At least one of the trailing arm, the link, or the rotatable latch may comprise steel.

A method for actuating a landing gear arrangement may include: supplying a first pressure to an actuator; applying, by the actuator, a moment on a latch to rotate the latch in a first rotational direction; disengaging a first roller pin; engaging a stopper on a link; rotating the link in the first rotational direction about a pivot, the link coupled between a trailing arm and a shock strut; rotating the shock strut about a second end of the shock strut; rotating the trailing arm about a first end; and engaging a second roller pin.

In various embodiments, the method may further include: supplying a second pressure to the actuator; applying a moment on the latch to rotate the latch in a second rotational direction; disengaging the second roller pin; engaging the stopper on the link; rotating the link about the pivot in the second rotational direction; rotating the shock strut about the second end of the shock strut; rotating the trailing arm about the first end; and engaging the first roller pin. At least one of the disengaging and the engaging may be performed by the latch and at least one of the applying and the rotating the link may be performed by the actuator and at least one of the rotating the shock strut and the rotating the trailing arm may be in response to the rotating the link.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Figure 1A:
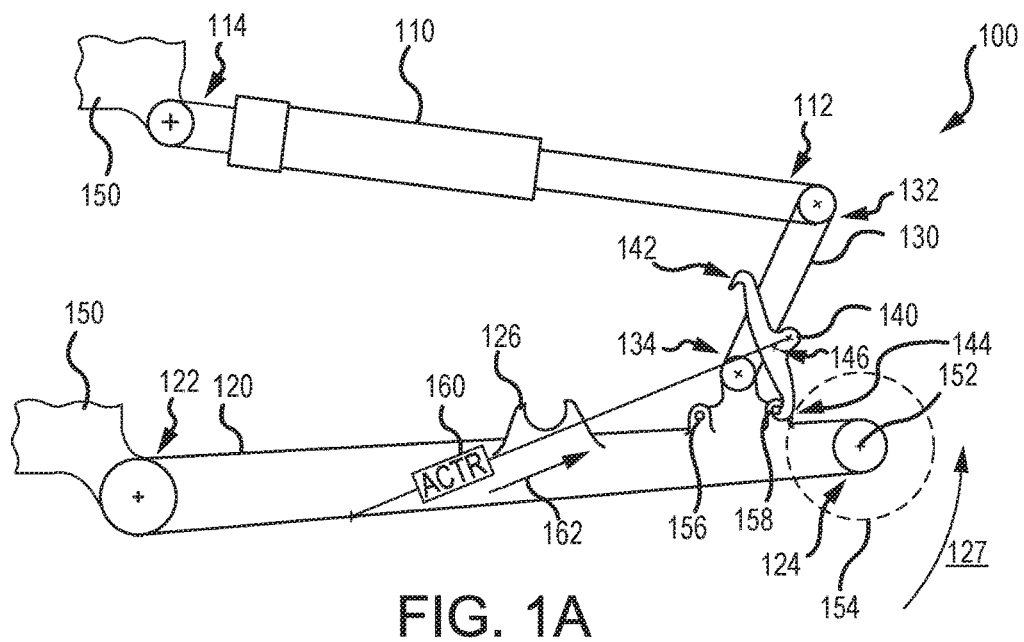
FIG. 1A illustrates a schematic view of a landing gear arrangement in a stowed position, in accordance with various embodiments.

With initial reference to FIG. 1A, a landing gear arrangement 100 is illustrated in a stowed position, in accordance with various embodiments. A landing gear arrangement may include a shock strut 110, a trailing arm 120, a link 130, a latch 140, and/or an actuator 160. Shock strut 110 may comprise a first end 112 and a second end 114. Link 130 may comprise a first end 132 and a second end 134. In various embodiments, first end 112 of shock strut 110 may be rotatably coupled to first end 132 of link 130. Shock strut 110 and link 130 may be rotatably coupled via a pin connection. In various embodiments, second end 114 of shock strut 110 may be rotatably coupled to a fuselage 150.

In various embodiments, trailing arm 120 may comprise a first end 122 and a second end 124. In various embodiments, first end 122 of trailing arm 120 may be rotatably coupled to fuselage 150. In various embodiments, second end 124 of trailing arm 120 may be coupled to an axle 152. A tire/wheel 154 may be coupled to axle 152. Thus, fuselage 150 may be supported, at least in part, by tire/wheel 154 via axle 152 and trailing arm 120 and shock strut 110. In various embodiments, trailing arm 120 may comprise a receiving member 126. Receiving member 126 may comprise a cradle, saddle, or the like. Receiving member 126 may be configured to receive a portion of link 130. For example, a pin connection between shock strut 110 and link 130 may be received by receiving member 126. In various embodiments, trailing arm 120 may include a first roller pin 156 and a second roller pin 158. In various embodiments, latch 140 may be rotatably coupled to link 130 via a pivot 146. Thus, latch 140 may be a rotatable latch. In various embodiments, pivot 146 may comprise a pin connection or the like. Latch 140 may comprise a first end 142 and a second end 144. In various embodiments, second end 144 of latch 140 may engage second roller pin 158 when landing gear arrangement is in the stowed position. In various embodiments, second end 144 of latch 140 may comprise a hook configured to clasp or partially perimetrically surround second roller pin 158 to prevent latch 140 from rotating about pivot 146, therefore preventing link 130 from rotating about second end 134 and hold the landing gear arrangement 100 in the stowed position. In various embodiments, first end 142 of latch 140 may be similar to second end 144 of latch 140. In various embodiments, second end 134 of link 130 may be rotatably coupled to trailing arm 120. An emergency feature may be included to ensure that the latch 140 can become disengaged from the second roller pin 158 in the case of a primary pressure not being available to the actuator 160.

In various embodiments, actuator 160 may be operatively coupled between trailing arm 120 and latch 140. Actuator 160 may be configured to extend or actuate in a first linear direction as illustrated by arrow 162. Thus, actuator 160 may be in an extended position when landing gear arrangement 100 is in a stowed position. Trailing arm 120 may be configured to rotate in a second rotational direction, as illustrated by arrow 127, in response to actuator 160 extending in the first linear direction 162. In various embodiments, link 130 may be configured to rotate in the second rotational direction 127 in response to the actuator 160 retracting or compressing.

Figure 1B:
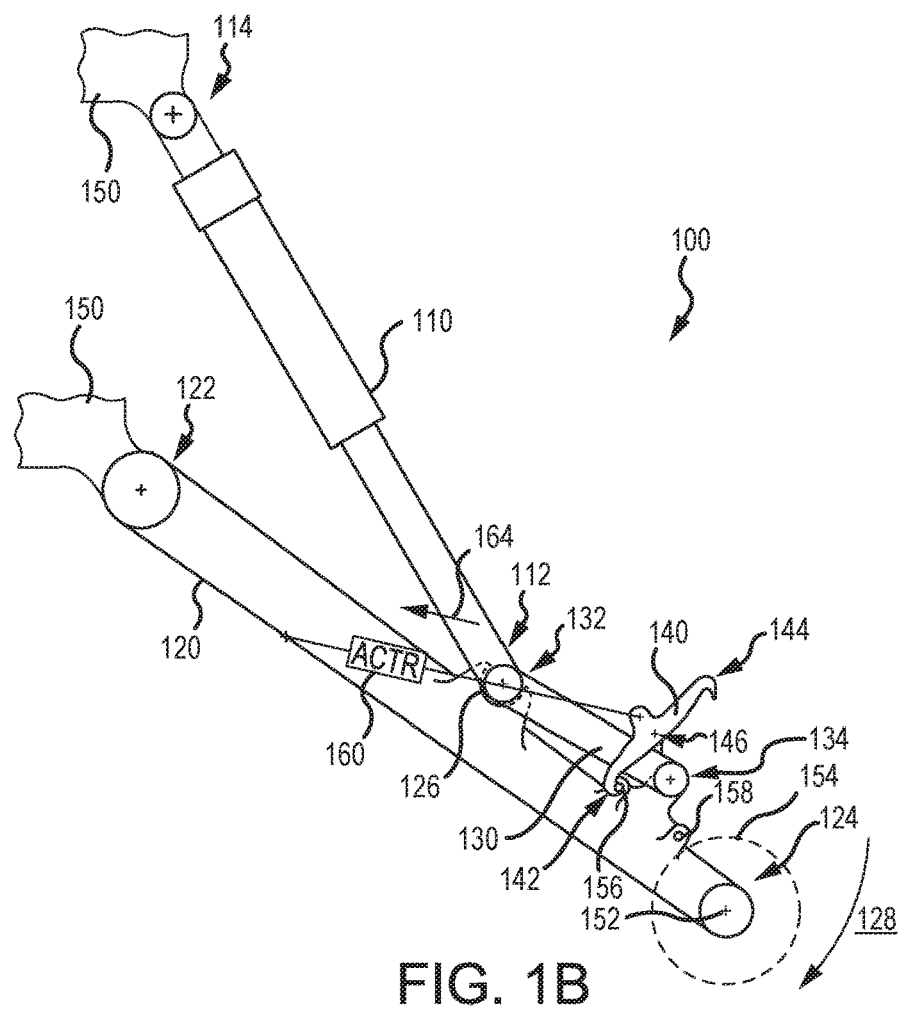
FIG. 1B illustrates a schematic view of a landing gear arrangement in a deployed position, in accordance with various embodiments.
Figure 2A:
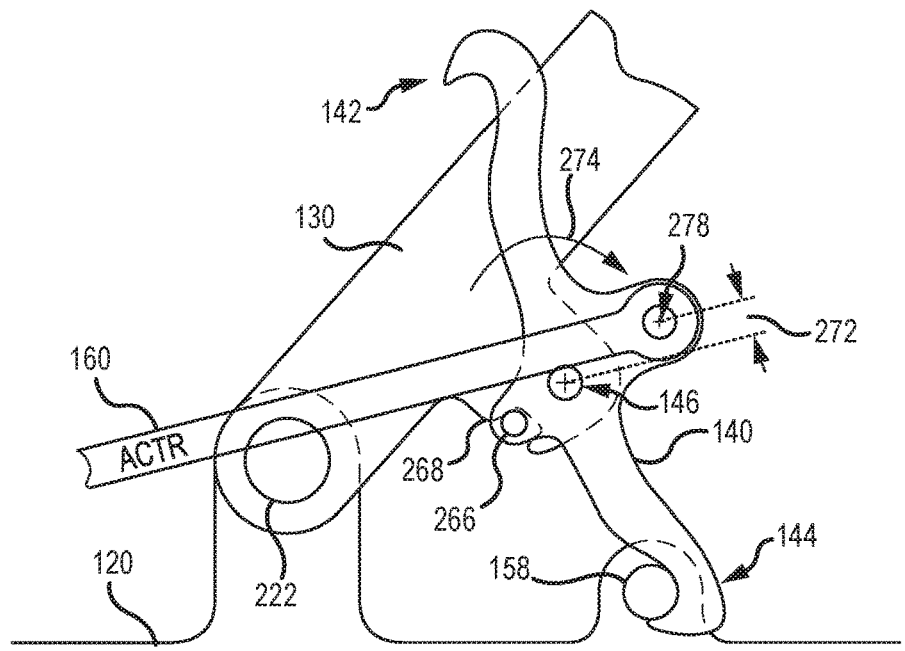
FIG. 2A illustrates a partial view of a landing gear arrangement in a stowed position with a latch engaged with a second roller pin, in accordance with various embodiments.
Figure 2B:
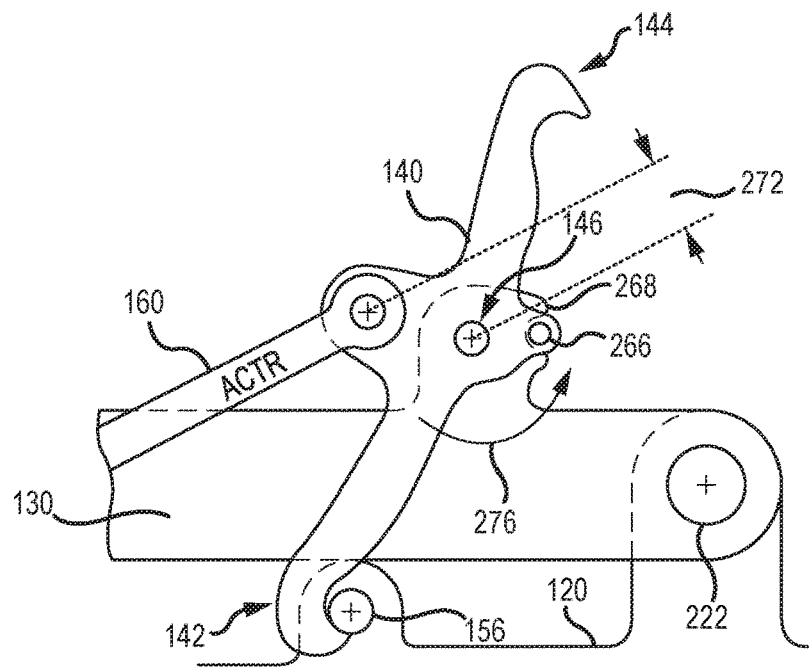
FIG. 2B illustrates a partial view of a landing gear arrangement in a deployed position with a latch engaged with a first roller pin, in accordance with various embodiments.

With reference collectively to FIG. 1B, FIG. 2A, and FIG. 2B, elements with like element numbering, as depicted in FIG. 1A, are intended to be the same and will not necessarily be repeated for the sake of clarity.

With reference to FIG. 1B, landing gear arrangement 100 is illustrated in a deployed position, in accordance with various embodiments. In various embodiments, first end 142 of latch 140 may engage first roller pin 156 when landing gear arrangement is in the deployed position. Actuator 160 may be configured to compress, retract, or otherwise actuate in a second linear direction as illustrated by arrow 164. Thus, actuator 160 may be in a compressed position when landing gear arrangement 100 is in a deployed position. Trailing arm 120 may be configured to rotate in a first rotational direction, as illustrated by arrow 128, in response to actuator 160 compressing or retracting in the second linear direction 164. In various embodiments, link 130 may be configured to rotate in the first rotational direction 128 in response to the actuator 160 extending. In various embodiments, actuator 160 may be powered via hydraulic pressure, pneumatic pressure, electromechanical actuators or combinations of the same. Thus, actuator 160 may be configured to extend, in direction 162, in response to an extend pressure (or first pressure) being applied to actuator 160. Actuator 160 may configured to compress or retract, in direction 164, in response to a retract pressure (or second pressure) being applied to actuator 160.

In various embodiments, a portion of link 130 may be located against receiving member 126 when landing gear arrangement is in the deployed position as illustrated in FIG. 1B. Thus, a mechanical force may be transferred from trailing arm 120 into shock strut 110 via receiving member 126, in response to tire/wheel 154 contacting the ground. Such mechanical force may be transferred from trailing arm 120 into shock strut 110, via receiving member 126, without relying on latch 140. In other words, such a mechanical force may transmit a load from trailing arm 120 into shock strut 110, receiving member 126, without transmitting a load into link 130 and latch 140.

With reference to FIG. 2A, a partial view of landing gear arrangement 100 (see FIG. 1A) is illustrated in a stowed position with latch 140 engaged with second roller pin 158, in accordance with various embodiments. In various embodiments, link 130 may comprise a stopper 268. Latch 140 may comprise a bumper 266. Bumper 266 may comprise a pin, roller, extruded boss, bolt, or the like. Stopper 268 may at least partially perimetrically surround bumper 266. Bumper 266 may rotate about pivot 146 with latch 140. Bumper 266 may contact stopper 268 to prevent latch 140 from rotating about pivot 146. Accordingly, a mechanical load or force may be transferred from actuator 160, through latch 140, bumper 266, and into stopper 268 of link 130 to rotate link 130 about pin 222. For example, in order to engage latch 140 with second roller pin 158, actuator 160 may actuate and extend, rotating latch 140 about pivot 146 in a first rotational direction, as illustrated by arrow 274. Latch 140 may rotate about pivot 146 in the first rotational direction 274 until bumper 266 contacts stopper 268 at which point a load is transferred from actuator 160 into link 130, rotating link 130 about pin 222 in the first rotational direction 274 until second end 144 engages second roller pin 158. In various embodiments, latch 140 may disengage second roller pin 158 in response to actuator 160 rotating latch 140 about pivot 146 in a second rotational direction 276 (see FIG. 2B). Latch 140 may rotate about pivot 146 in the second rotational direction 276 (see FIG. 2B) until second end 144 disengages second roller pin 158.

In various embodiments, actuator 160 may be coupled to latch 140 such that moment arm 272 is present. Moment arm 272 may be the linear distance between the center of pivot 146 and the point of rotation 278 between latch 140 and actuator 160 as measured in the direction perpendicular to the direction of actuation of actuator 160. Moment arm 272 may be configured such that actuator 160 rotates latch 140 about pivot 146 in the first rotational direction 274 in response to actuator 160 extending and rotates latch 140 about pivot 146 in the second rotational direction 276 (see FIG. 2B) in response to actuator 160 compressing or retracting.

In various embodiments, a spring may be used in landing gear arrangement 100 (see FIG. 1A) to hold latch 140 engaged to the first roller pin 156 and/or the second roller pin 158 while actuator 160 is in an unpowered state such as in flight after retraction is complete or on the ground after aircraft shutdown.

With reference to FIG. 2B, a partial view of landing gear arrangement 100 (see FIG. 1A) is illustrated in a deployed position with latch 140 engaged with first roller pin 156, in accordance with various embodiments. Actuator 160 may actuate and compress, rotating latch 140 about pivot 146 in a second rotational direction, as illustrated by arrow 276. Latch 140 may rotate about pivot 146 in the second rotational direction 276 until bumper 266 contacts stopper 268 at which point a load is transferred from actuator 160 into link 130, rotating link 130 about pin 222 in the second rotational direction 276. First end 142 may engage first roller pin 156 to prevent link 130 from rotating in the first rotational direction 274 (see FIG. 2A). In various embodiments, latch 140 may disengage first roller pin 156 in response to actuator 160 rotating latch 140 about pivot 146 in the first rotational direction 274 (see FIG. 2A). Latch 140 may rotate about pivot 146 in the first rotational direction 274 (see FIG. 2A) until first end 142 disengages first roller pin 156. In various embodiments, pivot 146 may be located between first end 142 and second end 144.

Stopper 268 may be configured such that stopper 268 does not prevent disengagement of latch 140 from first roller pin 156. Stopper 268 may be configured such that stopper 268 does not prevent disengagement of latch 140 from second roller pin 158.

In various embodiments, with reference to FIG. 2A, as link 130 rotates in first rotational direction 274, second end 144 of latch 140 may engage second roller pin 158 causing latch 140 to rotate about pivot 146 in a direction against the force of the actuator 160 via moment arm 272 (i.e, in second rotational direction 276 (see FIG. 2B)) until second end 144 clears second roller pin 158 at which time latch 140 may rotate in a direction of the force of actuator 160 (i.e., in first rotational direction 274) to lock latch 140 against second roller pin 158. A similar procedure may occur in response to link 130 rotating in second rotational direction 276 (see FIG. 2B).

Figure 3:
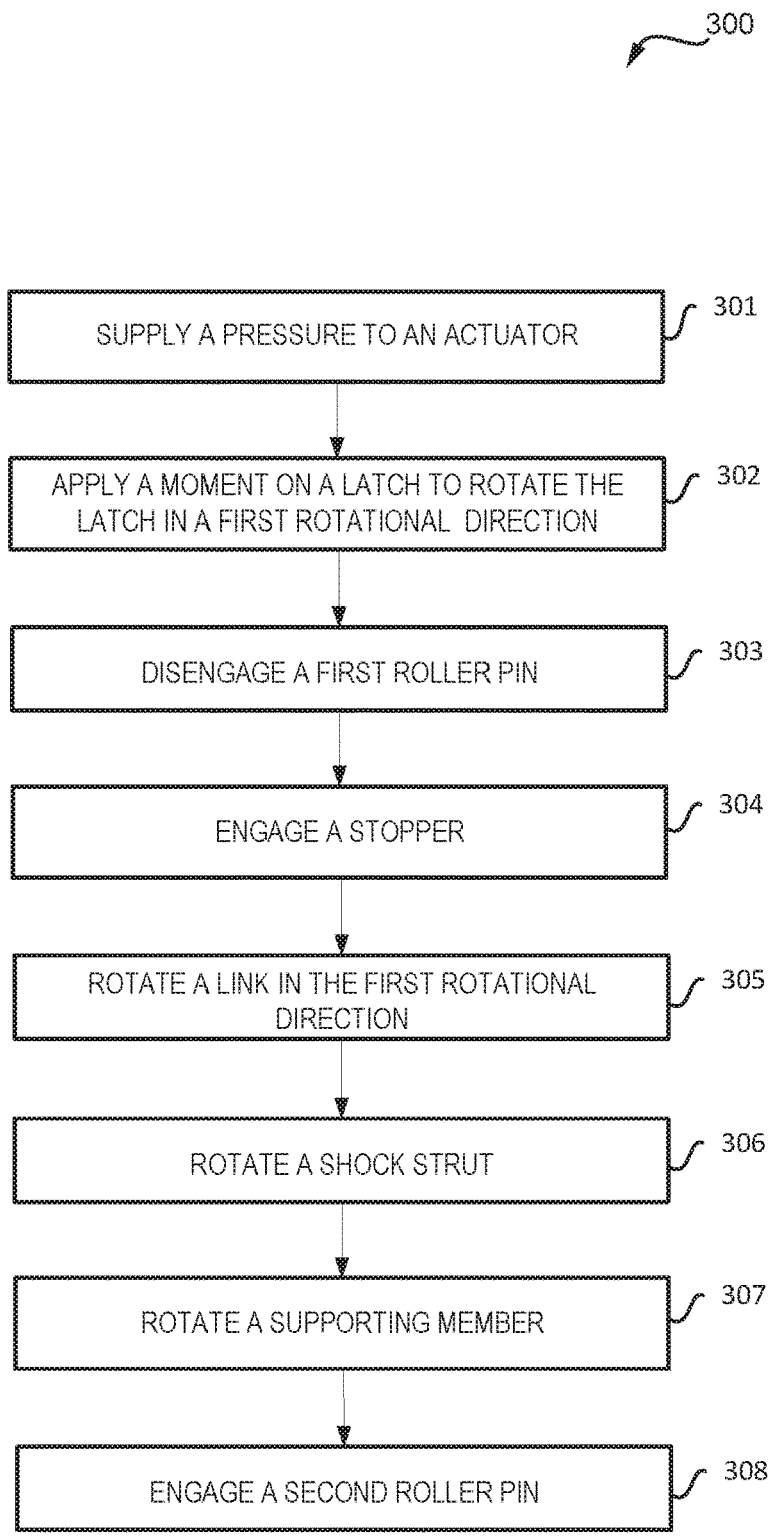
FIG. 3 provides a method for actuating a landing gear arrangement, in accordance with various embodiments.

In various embodiments, with reference to FIG. 3, a method 300 for actuating a landing gear arrangement is provided, in accordance with various embodiments. Method 300 may include supplying a pressure to an actuator (see step 301). Method 300 may include applying a moment on a latch to rotate the latch in a first rotational direction (see step 302). Method 300 may include disengaging a first roller pin (see step 303). Method 300 may include engaging a stopper (see step 304). Method 300 may include rotating a link in a first rotational direction (see step 305). Method 300 may include rotating a shock strut (see step 306). Method 300 may include rotating a trailing arm (see step 307). Method 300 may include engaging a second roller pin (see step 308).

With further reference to FIG. 1A, step 301 may include supplying a pressure to actuator 160. The pressure may be hydraulic or pneumatic. Step 302 may include applying, by actuator 160, a moment via moment arm 272 on latch 140 to rotate latch 140 in first rotational direction 274 (see FIG. 2A). Step 303 may include disengaging, by latch 140, first roller pin 156. Step 304 may include engaging, by latch 140 via bumper 266 (see FIG. 2B) stopper 268. Step 305 may include rotating, by actuator 160, link 130 in first rotational direction 274 (see FIG. 2A) about pin 222. Step 306 may include rotating shock strut 110 about second end 114. Shock strut 110 may rotate in the second rotational direction 276 (see FIG. 2B). Step 307 may include rotating trailing arm 120 about first end 122. Trailing arm 120 may rotate in the second rotational direction 276 (see FIG. 2B). Step 308 may include engaging, by latch 140, second roller pin 158.

In various embodiments, at least one of the trailing arm 120, the link 130, or the latch 140 may be made of a steel alloy (for example, 300M low alloy steel, such as SAE AMS6417 specification) or titanium alloys (for example, Ti-10-2-3, such as SAE AMS4983 specification). At least one of the trailing arm 120, the link 130, or the latch 140 may be coated with one or more coatings to prevent corrosion or otherwise improve mechanical properties and/or service life.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear arrangement comprising:
   a trailing arm;
   a shock strut;
   a link rotatably coupled to a first end of the shock strut and rotatably coupled to the trailing arm, the link including a pivot;
   a rotatable latch rotatably coupled to the link; and
   an actuator coupled between the rotatable latch and the trailing arm, the rotatable latch configured to rotate about the pivot, the pivot located between a first end and a second end of the rotatable latch, the rotatable latch configured to rotate in a first rotational direction in response to the actuator extending and configured to rotate in a second rotational direction in response to the actuator compressing.

2. The landing gear arrangement of claim 1, wherein the link is configured to rotate in the first rotational direction in response to the actuator extending and configured to rotate in the second rotational direction in response to the actuator compressing.

3. The landing gear arrangement of claim 2, wherein the landing gear arrangement is configured to move to an extended position in response to the actuator compressing and is configured to move to a stowed position in response to the actuator extending.

4. The landing gear arrangement of claim 3, wherein the trailing arm includes a receiving member, the receiving member configured to receive a portion of the link in response to the landing gear arrangement moving to the extended position.

5. The landing gear arrangement of claim 4, wherein the trailing arm includes a first roller pin and a second roller pin, the rotatable latch configured to be fastened to the first roller pin in response to the actuator compressing and configured to be fastened to the second roller pin in response to the actuator extending.

6. The landing gear arrangement of claim 1, wherein the trailing arm is configured to be rotatably coupled to a fuselage at a first end of the trailing arm and configured to be coupled to an axle at a second end of the trailing arm.

7. The landing gear arrangement of claim 6, wherein the actuator is coupled to the trailing arm proximate the first end and the link is coupled to the trailing arm proximate the second end.

8. The landing gear arrangement of claim 1, wherein a second end of the shock strut is rotably coupled to a fuselage.

9. The landing gear arrangement of claim 1, wherein the link is connected to the shock strut and the trailing arm via a pin connection at each end.

10. A landing gear arrangement, comprising:
    a rotatable latch rotatably coupled to a pivot, the pivot located on a link between a trailing arm and a first end of a shock strut; and
    an actuator operatively coupled to the rotatable latch, the actuator configured to actuate in a first linear direction to apply a first moment to the rotatable latch to rotate the rotatable latch in a first rotational direction, wherein the rotatable latch disengages a first roller pin in response to the rotation.

11. The landing gear arrangement of claim 10, wherein the actuator is configured to actuate in a second linear direction to apply a second moment to the rotatable latch to rotate the rotatable latch in a second rotational direction, wherein the rotatable latch disengages a second roller pin in response to the rotation.

12. The landing gear arrangement of claim 11, wherein the trailing arm is configured to rotate about a first end of the trailing arm in the first rotational direction in response to the actuator actuating in the second linear direction, and configured to rotate about the first end of the trailing arm in the second rotational direction in response to the actuator actuating in the first linear direction.

13. The landing gear arrangement of claim 12, wherein a first end of the link is configured to be received by a receiving member in response to the actuator actuating in the second linear direction.

14. The landing gear arrangement of claim 13, wherein the trailing arm is rotatably coupled to a fuselage at the first end of the trailing arm and coupled to an axle at a second end of the trailing arm.

15. The landing gear arrangement of claim 14, wherein the shock strut is rotatably coupled to the link at the first end of the shock strut and rotatably coupled to the fuselage at a second end of the shock strut.

16. The landing gear arrangement of claim 15, wherein the rotatable latch is configured to engage a stopper in response to the rotatable latch rotating in at least one of the first rotational direction and the second rotational direction.

17. The landing gear arrangement of claim 16, wherein at least one of the trailing arm, the link, or the rotatable latch comprises steel.

* * * * *